US012100219B2

(12) United States Patent
Tanino et al.

(10) Patent No.: US 12,100,219 B2
(45) Date of Patent: Sep. 24, 2024

(54) GENERATING IMAGES OR TIMELINES BASED ON USER-CONFIGURED THRESHOLDS FOR NUMBER OF PEOPLE AND STAYING TIME IN TARGET AREA

(71) Applicant: Safie Inc., Tokyo (JP)

(72) Inventors: Kana Tanino, Tokyo (JP); Liye Guo, Tokyo (JP); Takahiro Hashimoto, Tokyo (JP); Wataru Oniki, Tokyo (JP); Masayuki Fujisawa, Tokyo (JP); Hiroaki Otomo, Tokyo (JP); Masakazu Kawazu, Tokyo (JP); Naoaki Kashiwagi, Tokyo (JP); Alisson Ninomiya, Tokyo (JP); Kazuki Matsuda, Tokyo (JP); Yusuke Oba, Tokyo (JP); Soichiro Oki, Tokyo (JP); Yukie Kojima, Tokyo (JP)

(73) Assignee: Safie Inc., Tokyo (JP)

( * ) Notice: Subject to any disclaimer, the term of this patent is extended or adjusted under 35 U.S.C. 154(b) by 0 days.

(21) Appl. No.: 18/364,598

(22) Filed: Aug. 3, 2023

(65) Prior Publication Data
US 2024/0046652 A1 Feb. 8, 2024

(30) Foreign Application Priority Data
Aug. 3, 2022 (JP) .................. 2022-123856

(51) Int. Cl.
*G06V 20/52* (2022.01)
(52) U.S. Cl.
CPC .................. *G06V 20/53* (2022.01)
(58) Field of Classification Search
CPC .................................... G06V 20/53
See application file for complete search history.

(56) References Cited

U.S. PATENT DOCUMENTS 8,812,344 B1 * 8/2014 Saurabh ............. G06Q 30/0201
705/7.29
9,872,151 B1 * 1/2018 Puzanov ................ H04L 67/02
(Continued)

FOREIGN PATENT DOCUMENTS

CA 2672511 A1 * 1/2010 ......... G06K 9/00771
EP 4394338 A2 * 7/2024
(Continued)

OTHER PUBLICATIONS

M. Cruz, et al "A People Counting System for Use in CCTV Cameras in Retail," 2020 IEEE 12th Int'l Conf on Humanoid, Nanotechnology, IT, Comm and Control, Environment, and Management (HNICEM), Manila, Philippines, 2020, pp. 1-6, doi: 10.1109/HNICEM51456.2020.9400048. (Year: 2020).*

(Continued)

*Primary Examiner* — Michael Robert Cammarata
(74) *Attorney, Agent, or Firm* — Osha Bergman Watanabe & Burton LLP

(57) ABSTRACT

A system according to an embodiment of the present disclosure is a system for displaying a video captured by a camera connected to a network. The system is configured to set, in response to instructions from a user, a first threshold regarding the number of people staying in a target area and a second threshold regarding a period of time during which the people stay in the target area, measure the number of people staying in the target area and a period of time during which the people stay in the target area, generate a thumbnail showing a video when the number of people staying in the target area for a period of time equal to or longer than the second threshold is equal to or greater than the first threshold, and display the thumbnail generated.

13 Claims, 12 Drawing Sheets

(56) References Cited

U.S. PATENT DOCUMENTS

| | | | |
|---|---|---|---|
| 10,185,965 B2* | 1/2019 | Matsumoto | G06Q 30/02 |
| 10,567,677 B2* | 2/2020 | Hagisu | G06V 40/23 |
| 11,157,929 B1* | 10/2021 | Eby | H04L 67/52 |
| 11,379,765 B2* | 7/2022 | Winborne | G06Q 10/0637 |
| 2009/0164284 A1* | 6/2009 | Koiso | G06Q 10/00 |
| | | | 705/7.29 |
| 2012/0140982 A1 | 6/2012 | Sukegawa et al. | |
| 2014/0161316 A1* | 6/2014 | Golan | G06F 16/5854 |
| | | | 382/103 |
| 2015/0254514 A1* | 9/2015 | Oami | G06V 20/52 |
| | | | 707/722 |
| 2015/0294183 A1 | 10/2015 | Watanabe et al. | |
| 2016/0012379 A1* | 1/2016 | Iwai | G06Q 30/0601 |
| | | | 705/7.15 |
| 2016/0104174 A1* | 4/2016 | Matsumoto | G06V 20/53 |
| | | | 705/7.29 |
| 2016/0180173 A1* | 6/2016 | Westmacott | G07F 19/207 |
| | | | 382/103 |
| 2016/0217330 A1 | 7/2016 | Oami et al. | |
| 2016/0350596 A1* | 12/2016 | Bataller | G06T 7/80 |
| 2017/0188199 A1* | 6/2017 | Ashley, Jr. | G06V 20/52 |
| 2018/0061161 A1* | 3/2018 | Nagao | G06Q 10/04 |
| 2018/0181815 A1 | 6/2018 | Kanda et al. | |
| 2018/0211507 A1* | 7/2018 | Ihara | G08B 21/18 |
| 2018/0247505 A1* | 8/2018 | Arai | G06V 40/10 |
| 2019/0012547 A1* | 1/2019 | Togashi | H04N 7/18 |
| 2019/0108561 A1* | 4/2019 | Shivashankar | G06F 17/18 |
| 2019/0213424 A1 | 7/2019 | Oami et al. | |
| 2020/0167948 A1* | 5/2020 | Shimmoto | H04N 23/698 |
| 2020/0184205 A1* | 6/2020 | Yamasaki | G06V 40/103 |
| 2020/0228747 A1* | 7/2020 | Ventura | H04N 21/4668 |
| 2020/0302188 A1* | 9/2020 | Iwai | G06T 7/60 |
| 2020/0327315 A1* | 10/2020 | Mullins | G08B 13/1968 |
| 2020/0344568 A1* | 10/2020 | Joseph | G01C 21/3679 |
| 2020/0372259 A1* | 11/2020 | Adachi | H04N 23/611 |
| 2021/0271855 A1* | 9/2021 | Kamio | H04N 7/183 |
| 2021/0281803 A1* | 9/2021 | Hirasawa | G06V 20/52 |
| 2022/0375227 A1* | 11/2022 | Ito | G06V 40/103 |
| 2023/0114454 A1* | 4/2023 | Jenkins | H04N 23/80 |
| | | | 348/222.1 |

FOREIGN PATENT DOCUMENTS

| | | | | |
|---|---|---|---|---|
| JP | 2006-19845 A | | 1/2006 | |
| JP | 2009075802 A | * | 4/2009 | ......... G06K 9/00335 |
| JP | 2010-277547 A | | 12/2010 | |
| JP | 2012-123460 A | | 6/2012 | |
| JP | 5728654 B1 | * | 6/2015 | ......... G06K 9/00771 |
| JP | 2015-203912 A | | 11/2015 | |
| JP | 6047910 B2 | | 12/2016 | |
| JP | 2017123025 A | * | 7/2017 | |
| JP | 2017-188023 A | | 10/2017 | |
| JP | 6241666 B2 | * | 12/2017 | |
| JP | 2018-110303 A | | 7/2018 | |
| JP | 2019-220735 A | | 12/2019 | |
| JP | 2020-166590 A | | 10/2020 | |
| JP | 2021-72475 A | | 5/2021 | |
| JP | 2021092930 A | * | 6/2021 | ........... G06F 16/635 |
| JP | 2021-100173 A | | 7/2021 | |
| JP | 2021-136656 A | | 9/2021 | |
| JP | 2021-145243 A | | 9/2021 | |
| JP | 2022-053126 A | | 4/2022 | |
| WO | 2015/040929 A1 | | 3/2015 | |
| WO | WO-2015186317 A1 | * | 12/2015 | ........... G08B 13/196 |
| WO | 2017/026155 A1 | | 2/2017 | |
| WO | WO-2017024045 A1 | * | 2/2017 | ........... G06F 16/435 |
| WO | 2021/241587 A1 | | 12/2021 | |
| WO | WO-2022249635 A1 | * | 12/2022 | |

OTHER PUBLICATIONS

Notice of Reasons for Refusal issued in corresponding Japanese Application No. 2022-123856 mailed Nov. 14, 2022 (13 pages).
Decision to Grant a Patent issued in corresponding Japanese Application No. 2022-123856 mailed Apr. 10, 2023 (5 pages).
Notice of Reasons for Refusal issued in corresponding Japanese Application No. 2023-003631 mailed May 18, 2023 (3 pages).

* cited by examiner

GENERATING IMAGES OR TIMELINES BASED ON USER-CONFIGURED THRESHOLDS FOR NUMBER OF PEOPLE AND STAYING TIME IN TARGET AREA

TECHNICAL FIELD

The present disclosure relates to a system and a program.

BACKGROUND ART

A technique for setting a monitoring area within an imaging range of a camera installed for crime prevention purposes and detecting whether a suspicious person is within the monitoring area has been known.

CITATION LIST

Patent Literature

Patent Literature 1: Japanese Patent No. 6047910

SUMMARY OF THE INVENTION

Technical Problem

On the other hand, installing a camera in, for example, stores, and using a video captured by the camera for digital transformation (DX) has recently been attempted. In this case, from a new viewpoint different from the crime prevention purposes as in the known technique, it may be necessary to provide richer information usable for purposes other than crime prevention in accordance with a video captured by the camera.

Thus, an object to be solved by the present disclosure is to provide a system and a program that can provide richer information usable for purposes other than crime prevention in accordance with a video captured by a camera.

Means for Solving the Problem

A system according to an embodiment of the present disclosure is a system for displaying a video captured by a camera connected to a network. The system is configured to set, in response to instructions from a user, a first threshold regarding the number of people staying in a target area and a second threshold regarding a period of time during which the people stay in the target area, measure the number of people staying in the target area and a period of time during which the people stay in the target area, generate a thumbnail showing a video when the number of people staying in the target area for a period of time equal to or longer than the second threshold is equal to or greater than the first threshold, and display the thumbnail generated.

A system according to another embodiment of the present disclosure is a system for displaying a video captured by a camera connected to a network. The system is configured to set, in response to instructions from a user, a first threshold regarding the number of people staying in a target area and a second threshold regarding a period of time during which the people stay in the target area, measure the number of people staying in the target area and a period of time during which the people stay in the target area, generate a timeline showing information when the number of people staying in a predetermined area for a period of time equal to or longer than the second threshold is equal to or greater than the first threshold in time series, and display the timeline generated.

A system according to still another embodiment of the present disclosure is a system for displaying a video captured by a camera connected to a network. The system is configured to set, in response to instructions from a user, a line indicating a boundary line with a target area, an IN direction indicating a direction in which people enter the target area across the line and an OUT direction indicating a direction in which people exit the target area across the line, separately add up the number of people passing the line in the IN direction and the number of people passing the line in the OUT direction, generate a graph separately showing the time transitions of the number of people passing the line in the IN direction and the number of people passing the line in the OUT direction, and display the graph generated.

A program according to still another embodiment of the present disclosure is a program for displaying a video captured by a camera connected to a network. The program causes a computer to execute setting, in response to instructions from a user, a first threshold regarding the number of people staying in a target area and a second threshold regarding a period of time during which the people stay in the target area, measuring the number of people staying in the target area and a period of time during which the people stay in the target area, generating a thumbnail showing a video when the number of people staying in the target area for a period of time equal to or longer than the second threshold is equal to or greater than the first threshold, and displaying the thumbnail generated.

A program according to still another example of the present disclosure is a program for displaying a video captured by a camera connected to a network. The program causes a computer to execute setting, in response to instructions from a user, a first threshold regarding the number of people staying in a target area and a second threshold regarding a period of time during which the people stay in the target area, measuring the number of people staying in the target area and a period of time during which the people stay in the target area, generating a timeline showing information when the number of people staying in a predetermined area for a period of time equal to or longer than the second threshold is equal to or greater than the first threshold in time series, and displaying the timeline generated.

A program according to still another example of the present disclosure is a program for displaying a video captured by a camera connected to a network. The program causes a computer to execute setting, in response to instructions from a user, a line indicating a boundary line with a target area, an IN direction indicating a direction in which people enter the target area across the line, and an OUT direction indicating a direction in which people exit the target area across the line, separately adding up the number of people passing the line in the IN direction and the number of people passing the line in the OUT direction, generating a graph separately showing the time transitions of the number of people passing the line in the IN direction and the number of people passing the line in the OUT direction, and displaying the graph generated.

DESCRIPTION OF EMBODIMENTS

Hereinafter, embodiments and modifications of the present disclosure will be described on the basis of the drawings. The configurations of the embodiments and modifications described below, as well as the actions and effects achieved by the configurations, are each merely an example and are not limited to the following description.

Embodiments

Figure 1:
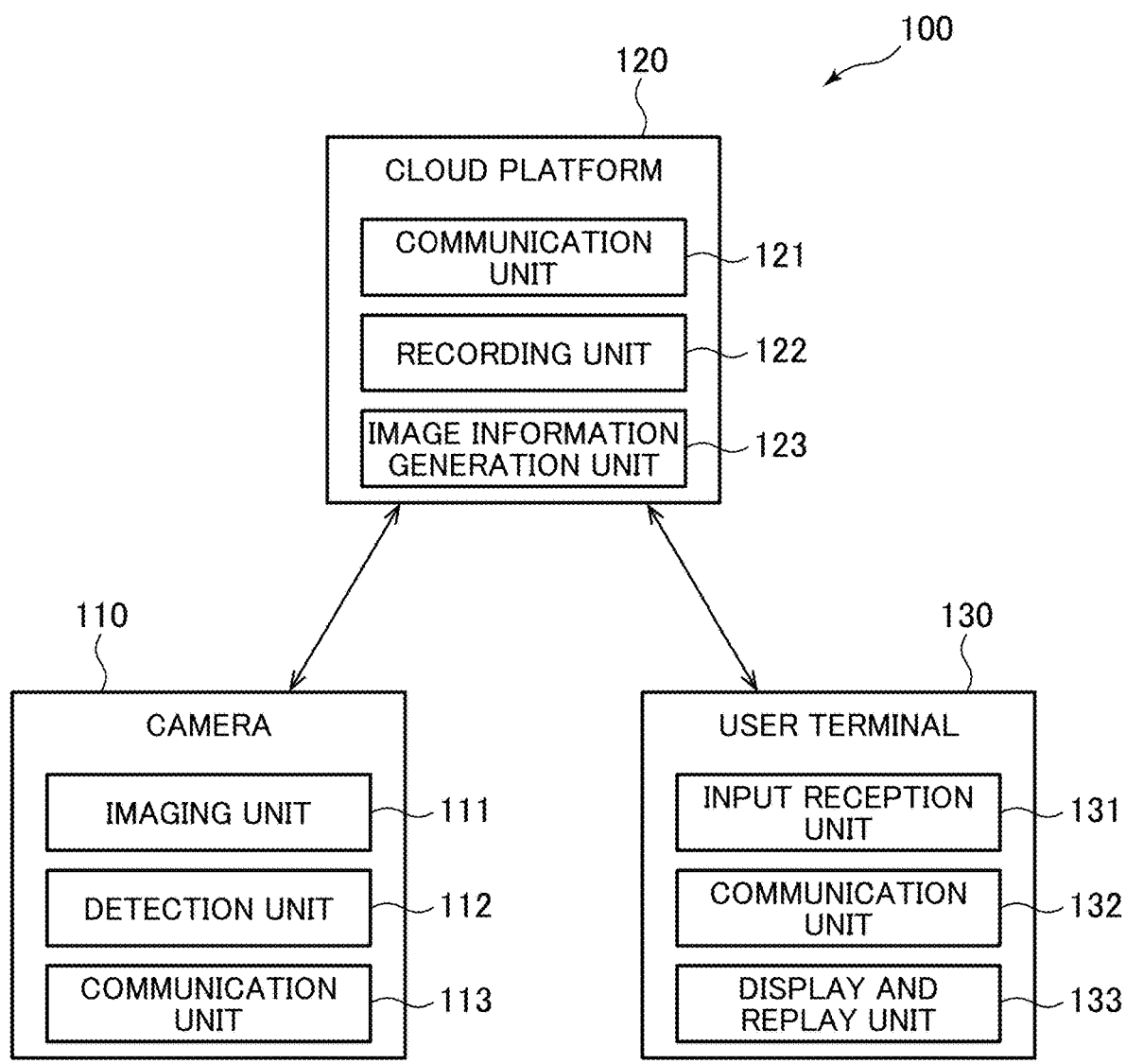
FIG. 1 is an exemplary and schematic block diagram illustrating a functional configuration of a system according to an embodiment.

FIG. 1 is an exemplary and schematic block diagram illustrating a functional configuration of a system 100 according to an embodiment.

As illustrated in FIG. 1, the system 100 according to an embodiment includes a camera 110, a cloud platform 120, and a user terminal 130.

The camera 110 includes an imaging unit 111, a detection unit 112, and a communication unit 113 as functional modules. The cloud platform 120 includes a communication unit 121, a recording unit 122, and an image information generation unit 123 as functional modules. The user terminal 130 includes an input reception unit 131, a communication unit 132, and a display and replay unit 133 as functional modules.

The camera 110 is installed, for example, in a store and is communicably connected to the cloud platform 120 via a network. The cloud platform 120 is communicably connected to the user terminal 130 via a network. Thus, a video captured by the camera (and information detected in accordance with the video) is provided to the user terminal 130 via the cloud platform 120 and used for DX for the store.

Here, using the video captured by the camera 110 for DX needs an approach from a new viewpoint different from the simple crime prevention purposes known in the art.

It is useful for DX to focus on, for example, the number of people staying (hereinafter may be referred to as the number of staying people) in an area such as in front of a cash register in a store and a period of time during which the people stay in the area (hereinafter may be referred to as a staying time). It is also useful for DX to determine the number of people entering and exiting an area in a store (hereinafter may be referred to as the number of passing people) while identifying in which direction people passing a line indicating a boundary of the area.

As just described, when the video captured by the camera 110 is used for DX, it is desirable to provide information usable for purposes other than crime prevention in accordance with the video.

Figure 2:
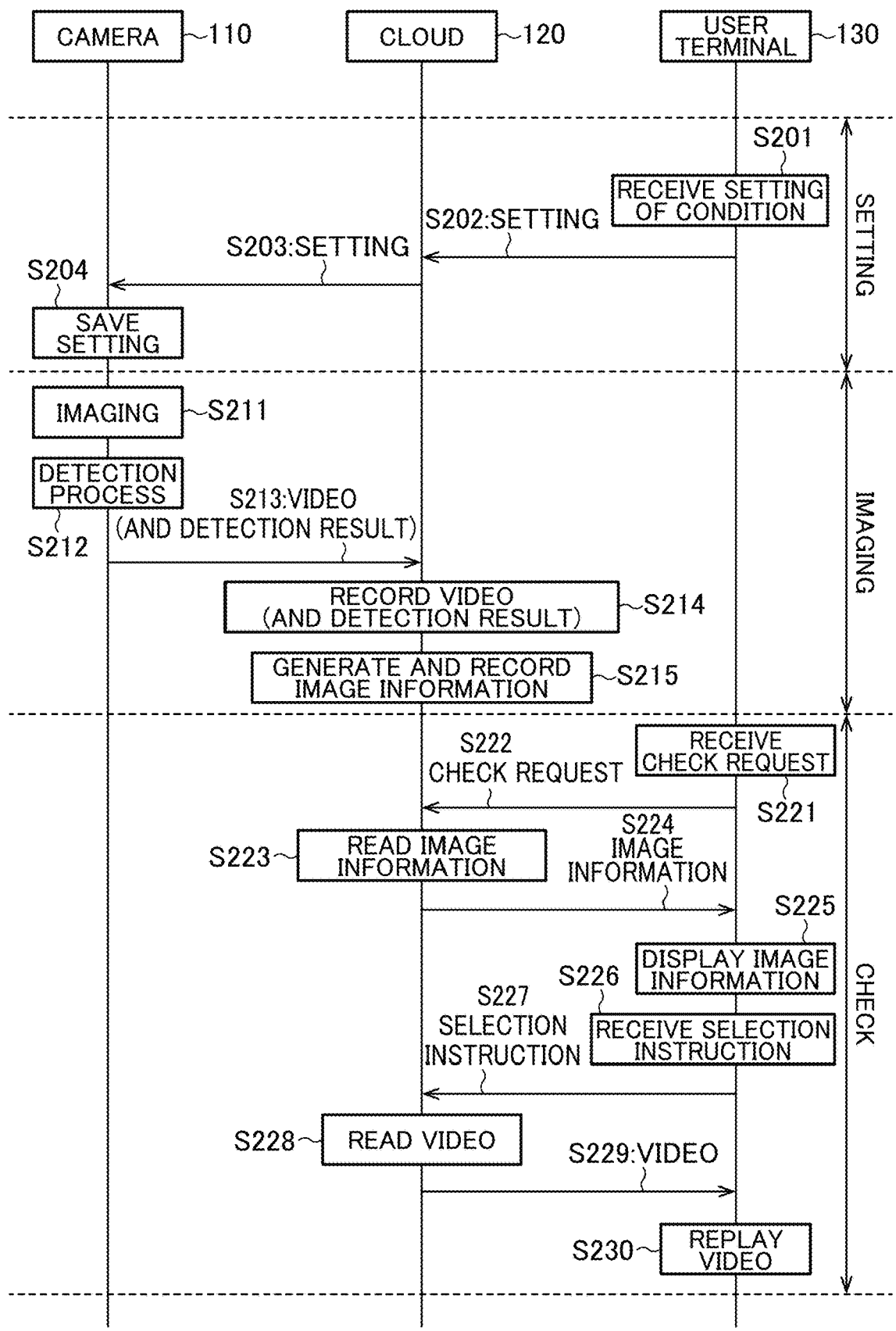
FIG. 2 is an exemplary and schematic sequence diagram illustrating a flow of processing performed in a system according to an embodiment.

Thus, in an embodiment, the functional modules illustrated in FIG. 1 operate according to a flow as illustrated in next FIG. 2, achieving the provision of information usable for purposes other than crime prevention in accordance with the video captured by the camera 110.

FIG. 2 is an exemplary and schematic sequence diagram illustrating a flow of processing performed in the system 100 according to an embodiment. In FIG. 2, the cloud platform 120 is simply expressed as a cloud 120 for the sake of simplification.

First, a setting process for setting various conditions for the camera 110 by using the user terminal 130 will be described. Although details will be described later, the conditions include, for example, a condition regarding which area in the imaging range of the camera 110 is targeted to detect the number of staying people and the staying time described above and a condition regarding which line in which area is targeted to detect the number of passing people.

Figure 3:
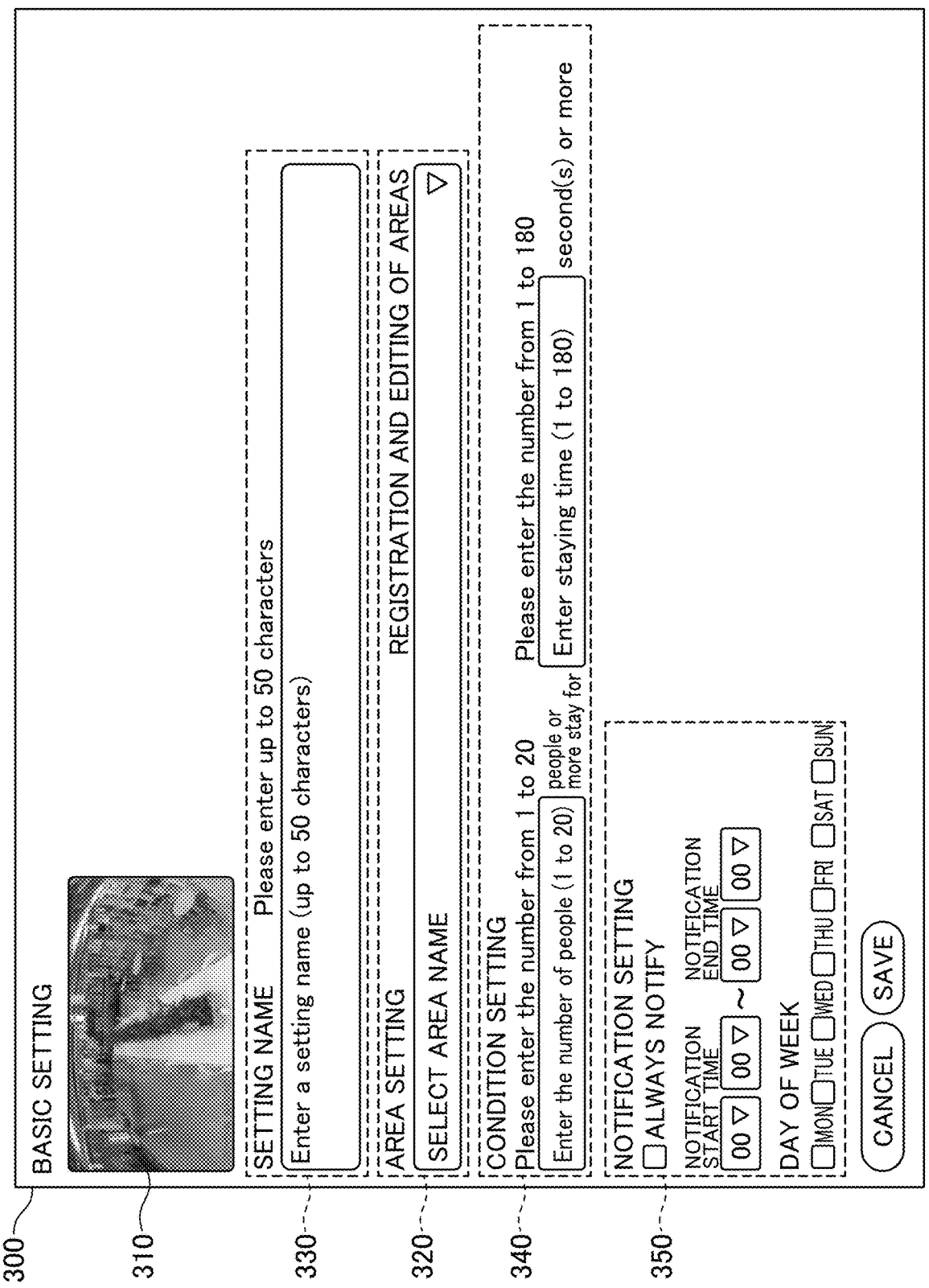
FIG. 3 is an exemplary and schematic diagram for explaining setting of conditions according to an embodiment.
Figure 4:
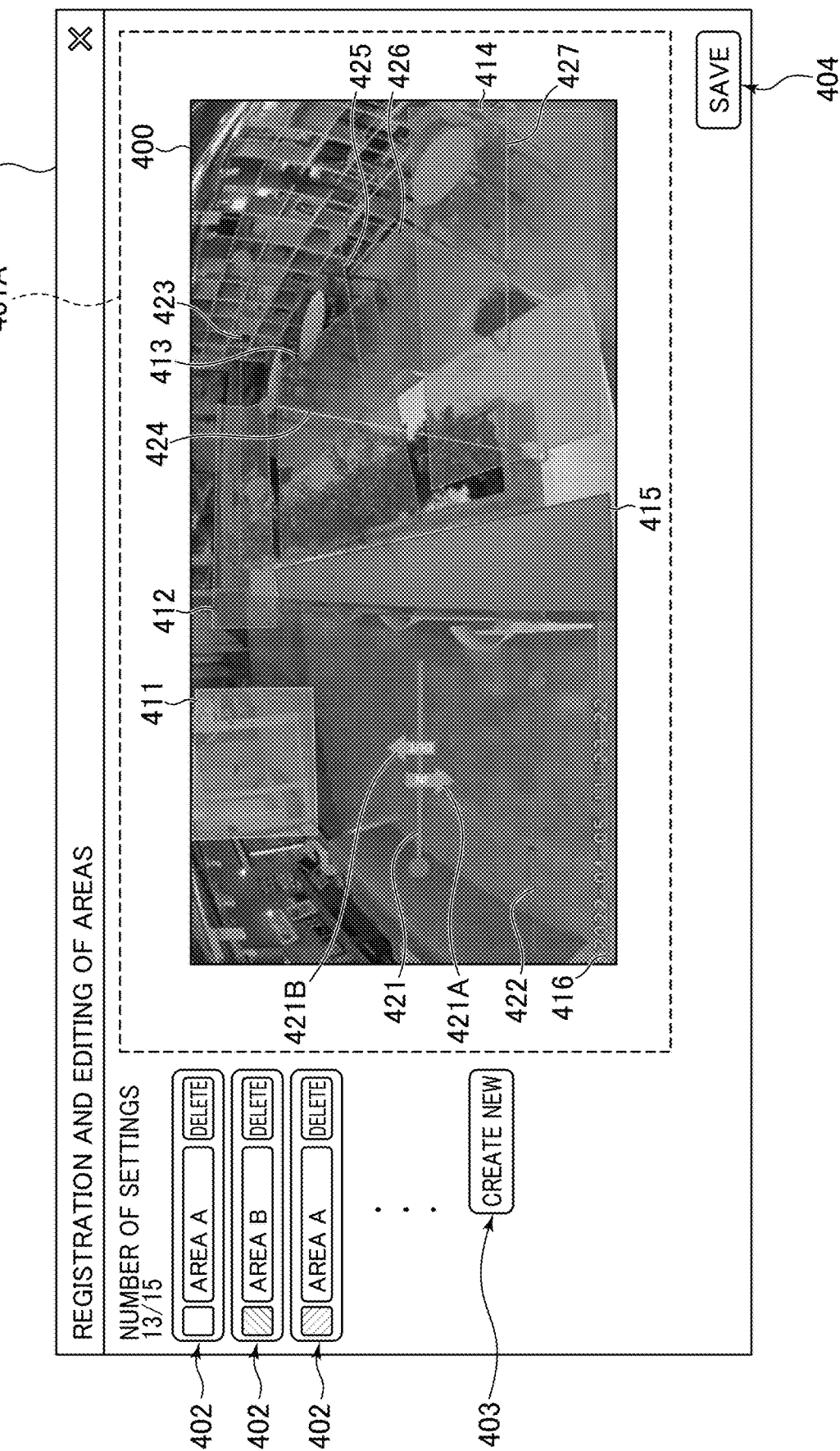
FIG. 4 is an exemplary and schematic diagram for explaining registration and editing of target areas according to an embodiment.

In the setting process, first, in step S201, the input reception unit 131 of the user terminal 130 receives a setting of conditions based on operations from a user via user interfaces (UIs) as illustrated in FIGS. 3 and 4 below.

FIG. 3 is an exemplary and schematic diagram for explaining setting of conditions according to an embodiment.

An image 300 illustrated in FIG. 3 is an example of a UI that receives operations relating to setting conditions from a user. This image 300 includes five regions 310, 320, 330, 340 and 350.

In the region 310, a video being currently captured by the camera 110 for the user's reference is displayed. In the region 320, an interface for receiving an input of a name for setting current setting details is displayed. In the region 330, an interface for receiving a setting of a target area for detection of the number of staying people and the staying time described above is displayed. Specifically, a list of pre-registered areas is displayed as a pull-down menu and an area selected by the user from the list is set. Area registration is performed in accordance with an operation from the user, for example, via a UI as illustrated in FIG. 4 below, which is displayed when he or she clicks "REGISTRATION AND EDITING OF AREAS" on the upper right. Here, the reason for designing area setting in the two steps of registration and selection is, when the user desires to set a plurality of settings with different conditions such as the number of people staying or a staying time for the same area, to reduce the user's effort to set the area from scratch every time and to make the position, size, shape, or the like of the area consistent and common.

FIG. 4 is an exemplary and schematic diagram for explaining registration and editing of target areas according to an embodiment. In this example, areas and lines are registered and edited on a common screen, but they may also be registered and edited on separate screens. On the left side, a list of set area names (or line names) 402 is displayed and information indicating an upper limit of the number of areas (or lines) that can be set and the number of currently set areas (or lines) and a create new button 403 for registering a new area (or line) are displayed. A "color icon" on the left side of each area name 402 is associated with the color of a corresponding area (or line) set in the image 400 displayed in a region 401A, and by clicking this color icon and selecting a color, it is possible to set a desired color for each area (or line). A "DELETE" button on the right side can be clicked to delete the corresponding area (or line). When one of the area names (or line names) 402 is clicked and selected, both the selected name and the corresponding area (or line) in the image 400 are highlighted to make it recognizable that the area (or line) is selected. Clicking or dragging the corresponding area (or line) in the image 400 with the area (or line) selected can change the position and shape of the area (or line).

An image 401 illustrated in FIG. 4 is an example of a UI that receives operations relating to setting target areas from the user. In the example illustrated in FIG. 4, for example, six areas 411 to 416 are set as target areas. The user can set an area having a desired position, size, and shape by performing drag-and-drop operations or the like on the image 400 displayed in the region 401A after clicking the create new button 403. For example, an area connecting vertices is set by sequentially clicking the vertices of the area and double-clicking the last vertex.

The image 400 illustrated in FIG. 4 is also used to set target lines for detecting the number of passing people described above. For example, in the example illustrated in FIG. 4, seven lines 421 to 427 are set as lines. The user can set a desired line by setting a start point and an end point by performing click operations or the like on the image 400 after clicking the create new button 403. For example, a first click determines a start point, a second click determines an end point, and a line connecting the two points and arrows in opposite directions indicating IN and OUT in directions perpendicular to the line are set.

Here, in the example illustrated in FIG. 4, one end of each of the lines 421 to 427 is highlighted with a round mark and the highlighted one end indicates an end point of the line. Also, the example illustrated in FIG. 4 sets two arrows 421A and 421B in opposite directions for the line 421, and the two arrows 421A and 421B are automatically set according to the setting of the start and end points of the line 421. Thus, because lines for counting IN and OUT can be drawn at once, the UI can reduce the user's trouble when performing operations, allow lines common to IN and OUT to be set accurately at the same place, and make the set lines visually easy to see. The arrows 421A and 421B are used to determine in which direction people pass the line 421 when detecting the number of passing people described above. In the example illustrated in FIG. 4, for example, the arrow 421A is defined as an IN direction and the arrow 421B is defined as an OUT direction. Although not illustrated in FIG. 4, two directions similar to those of the line 421 are obviously set for the other lines 422 to 427 as well. The present embodiment assumes that drawing lines at boundaries or the like when the entrance, exit, or floor of a building or a room is mainly divided into regions and that the number of people passing the lines is counted to visualize the flow of people in various places, and thus the words IN and OUT are used, but other words may be used. A save button 404 illustrated in FIG. 4 is an interface for receiving a click operation for saving the area and line settings made as described above.

Returning to FIG. 3, in the region 340, interfaces for receiving settings of thresholds for the number of staying people and the staying time described above are displayed. In the region 350, interfaces for receiving a setting of detecting whether the number of staying people and the staying time exceed the thresholds and a setting of what timing (such as a time period, day of the week, and date) to notify is displayed.

Returning to FIG. 2, after the conditions are set in step S201, the communication unit 132 of the user terminal 130 transmits the set conditions to the cloud platform 120 in step S202. The communication unit 121 of the cloud platform 120 then receives the conditions transmitted by the user terminal 130.

In step S203, the communication unit 121 of the cloud platform 120 transmits the conditions received from the user terminal 130 to the camera 110. The communication unit 113 of the camera 110 then receives the conditions transmitted by the cloud platform 120.

In step S204, the detection unit 112 of the camera 110 saves the conditions received from the cloud platform 120 for use in an imaging process described below. In this manner, the setting process ends.

Next, an imaging process including capturing of a video by the camera 110 and detection of various information based on the video will be described.

In the imaging process, first, the imaging unit 111 of the camera 110 captures a video in step S211. In step S212, the detection unit 112 of the camera 110 performs a detection process including measurement of the number of staying people and the staying time described above and adding-up of the number of passing people described above on the video in accordance with the settings made in the setting process. The number of staying people is detected, for example, by a logic as illustrated in FIG. 5 below.

Figure 5:
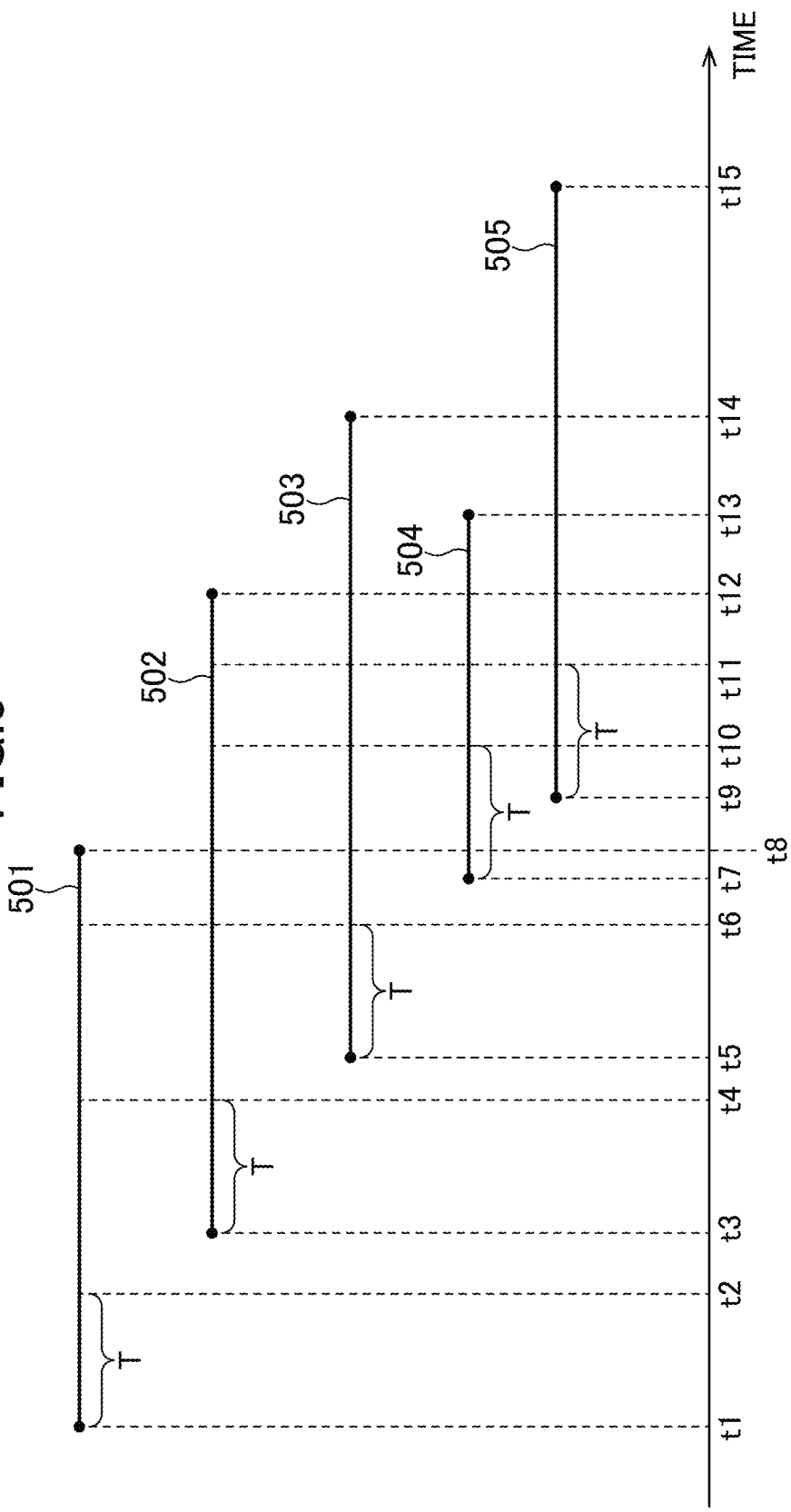
FIG. 5 is an exemplary and schematic diagram for explaining a logic of detection according to an embodiment.

FIG. 5 is an exemplary and schematic diagram for explaining the logic of detecting the number of staying people according to an embodiment.

In the example illustrated in FIG. 5, five line segments 501 to 505 indicate a staying time during which five people stay in a target area. More specifically, the line segment 501 indicates that the first person has stayed in the target area from time t1 to time t8. Similarly, the line segment 502 indicates that the second person has stayed in the target area from time t3 to time t12 and the line segment 503 indicates that the third person has stayed in the target area from time t5 to time t14. The line segment 504 indicates that the fourth person has stayed in the target area from time t7 to time t13 and the line segment 505 indicates that the fifth person has stayed in the target area from time t9 to time t15. Thus, in an embodiment, the staying time is measured by person.

Here, an embodiment is configured to count the number of people staying in the target area (the area set in step S201 in FIG. 2) for at least a predetermined period of time T (the staying time set in step S201) or longer as a number of staying people. When the number of staying people is equal to or greater than the number of people staying set in step S201, it is determined that the conditions (an area, the number of people staying, a staying time) set in step S201 are all satisfied. Thus, in the example illustrated in FIG. 5, the number of staying people increases to one for the first time at time t2 after the elapse of the predetermined period of time T from time t1 at which the first person enters the target area.

As indicated by the line segments 501 and 502, the first person still stays in the target area at time t4 after the elapse of the predetermined period of time T from time t3 at which the second person enters the target area. Thus, the number of staying people increases to two at time t4.

Similarly, as indicated by the line segments 501 to 503, the first to third persons will stay in the target area at time t6 after the elapse of the predetermined period of time T from time t5 at which the third person enters the target area. Thus, the number of staying people increases to three at time t6.

Here, as indicated by the line segment 501, the first person exits the target area at time t8. Thus, the number of staying people decreases to two at time t8. As indicated by the line segment 504, time t8 is after time t7 at which the fourth person enters the target area but before the elapse of the predetermined period of time T from time t7, and thus the number of staying people at t8 is two rather than three.

As indicated by the line segments 502 to 504, the second to fourth people will stay in the target area at time t10 after the elapse of the predetermined period of time T from time t7 at which the fourth person enters the target area. Thus, the number of staying people increases to three at time t10.

As indicated by the line segments 502 to 505, the second to fifth people will stay in the target area at time t11 after the elapse of the predetermined period of time T from time t9 at which the fifth persons enters the target area. Thus, the number of staying people increases to four at time t11.

As indicated by the line segment 502, the second person exits the target area at time t12. Thus, the number of staying people decreases to three at time t12. As indicated by the line segment 504, the fourth person exits the target area at time t13. Thus, the number of staying people decreases to 2 at time t13. As indicated by the line segment 503, the third person exits the target area at time t14. Thus, the number of staying people decreases to one at time t14. As indicated by the line segment 505, the fifth person exits the target area at time t15. Thus, the number of staying people decreases to zero at time t15.

Returning to FIG. 2, when step S212 ends, the communication unit 113 of the camera 110 transmits the video captured in step S211 and the result of the detection process in step S212 to the cloud platform 120 in step S213. Here, the video is associated with the captured time and the detection result includes at least the time at which the detection logic of FIG. 5 determines that the conditions set in step S201 are all satisfied. Here, the detection result may be transmitted only when the conditions set in step S201 are satisfied or may also be transmitted when the conditions are not satisfied. The communication unit 121 of the cloud platform 120 then receives the information transmitted by the camera 110.

In step S214, the recording unit 122 of the cloud platform 120 records the video and the detection result received from the camera 110. In step S215, the image information generation unit 123 of the cloud platform 120 generates image information such as, for example, thumbnails illustrated in FIG. 6 below as information useful for DX. In this manner, the imaging process ends.

Figure 6:
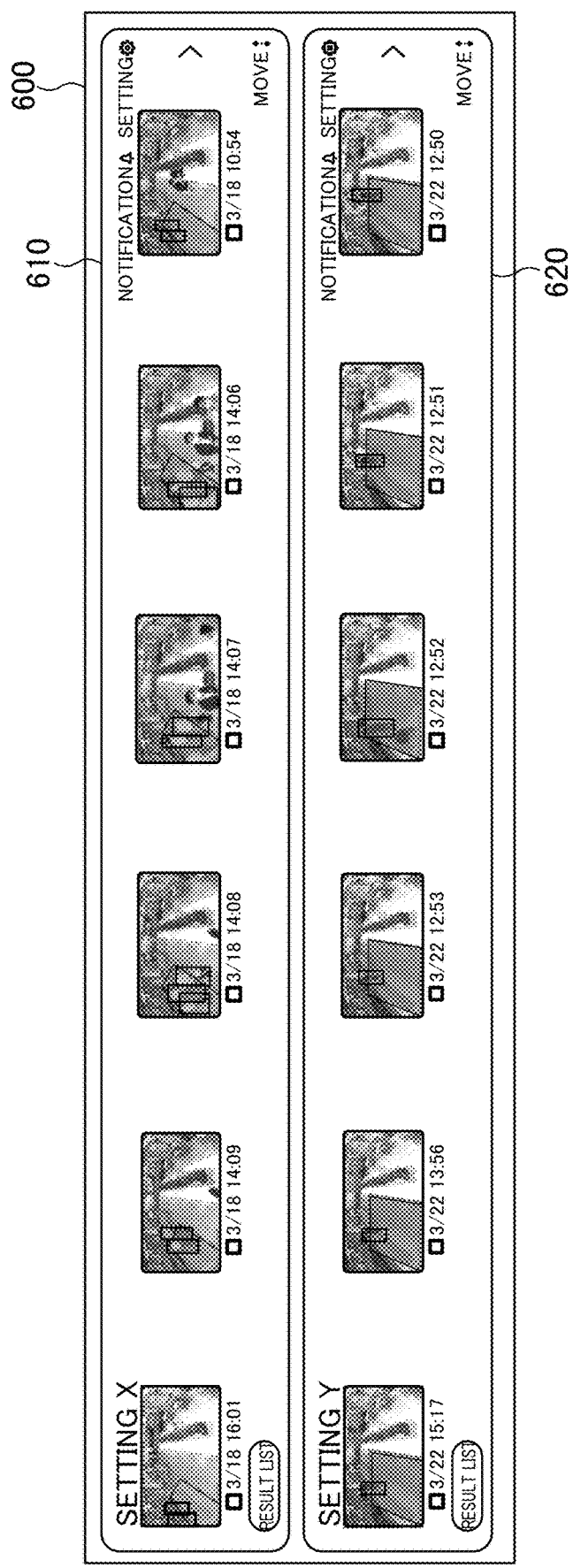
FIG. 6 is an exemplary and schematic diagram illustrating an example of a display mode of thumbnails according to an embodiment.

FIG. 6 is an exemplary and schematic diagram illustrating an example of a display mode of thumbnails according to an embodiment.

An image 600 illustrated in FIG. 6 is an example of a UI including thumbnails generated by the cloud platform 120. This UI can be provided to the user terminal 130 as information useful for DX in a check process which will be described later. The image 600 illustrated in FIG. 6 includes two regions 610 and 620. These two regions 610 and 620 show detection results under different settings.

In the example illustrated in FIG. 6, the regions 610 and 620 each display a plurality of thumbnails. The thumbnails are, for example, cutouts from the video at timing when various conditions set in the setting process described above are satisfied such as when it is determined by the detection logic of FIG. 5 that the conditions set in step S201 (see FIG. 2) are all satisfied or when the detected number of staying people exceeds the threshold (the first threshold) and the detected staying time exceeds the threshold (the second threshold). When such thumbnails are provided to the user terminal 130, it becomes possible for the user to appropriately narrow down the timing to which attention is to be paid in the video when checking the video for use in DX. Each thumbnail also displays the areas set in step S201 and bounding boxes indicating detected objects. This makes it easier for the user to search for a desired thumbnail in the plurality of thumbnails.

The image information useful for DX is not limited to the thumbnails described above. For example, in an embodiment, the image information generation unit 123 of the cloud platform 120 can also generate image information such as timelines illustrated in FIGS. 6 and 7 below.

Figure 7:
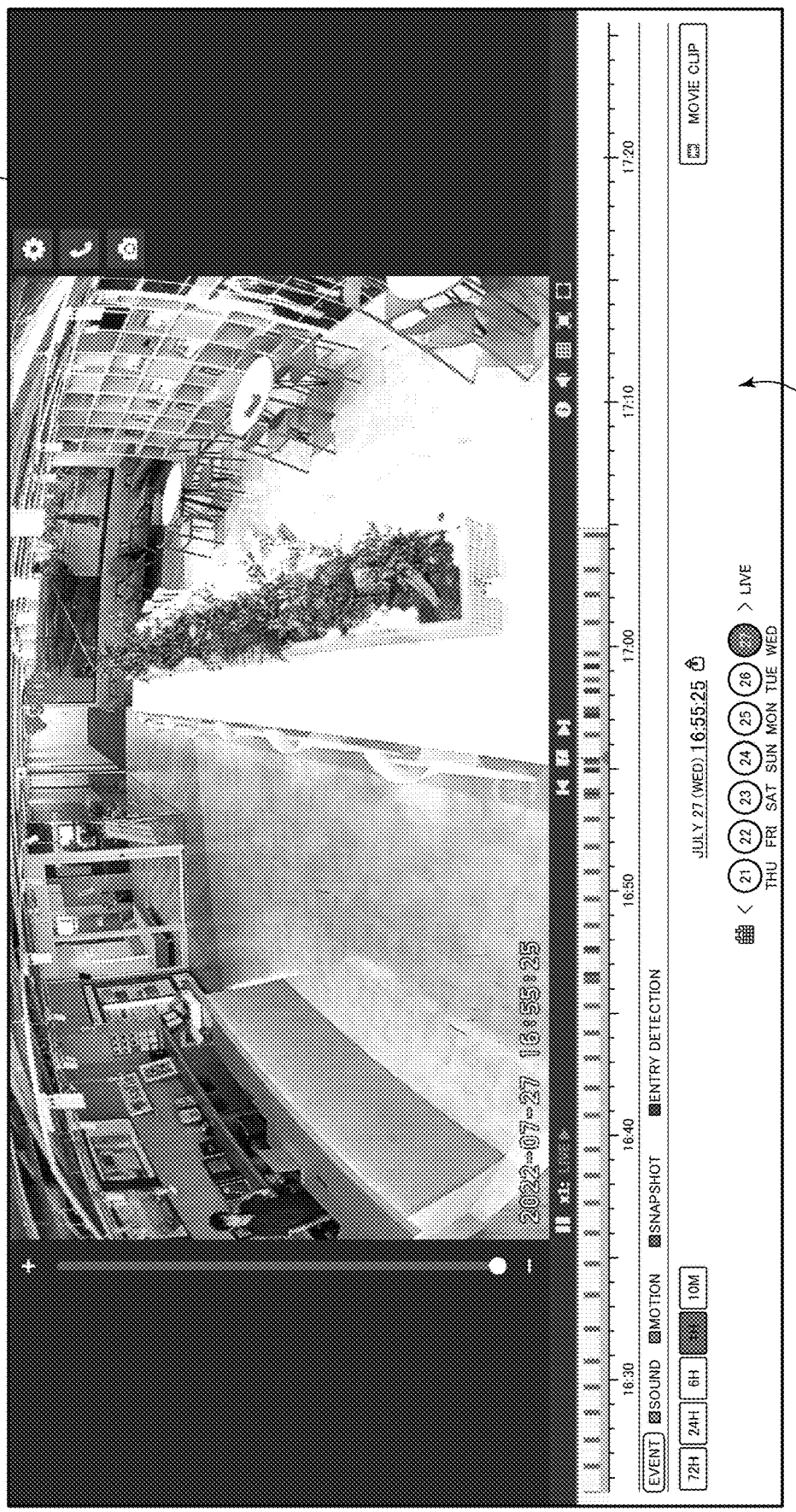
FIG. 7 is an exemplary and schematic diagram illustrating an example of a display mode of a timeline according to an embodiment.

FIG. 7 is an exemplary schematic diagram illustrating an example of a display mode of a timeline according to an embodiment. For example, when any of the thumbnails in FIG. 6 is clicked, a timeline centering on the corresponding time may be displayed.

An image 700 illustrated in FIG. 7 is an example of a UI including a timeline generated by the cloud platform 120. This UI can be provided to the user terminal 130 as information useful for DX in the check process which will be described later.

The image 700 illustrated in FIG. 7 includes a region 701 in which a timeline is displayed. This timeline recognizably shows, in time series, timing in the video at which various conditions set in the setting process described above are satisfied, such as the case where it is determined by the detection logic of FIG. 5 that the conditions set in step S201 (see FIG. 2) are all satisfied, the case where the detected number of staying people exceeds the threshold, or the case where the detected staying time exceeds the threshold. The term "recognizably" herein means an aspect of displaying, for example, timing at which the above conditions are satisfied in the timeline with colored bands, flags, or the like attached. In adding a color, the color preferably corresponds to the same color as a color set in the registration and editing of the regions (or lines) described above. In FIG. 7, cases satisfying the conditions described above are classified as "entry detection" events, and colored bands are displayed on the timeline with colors recognizable from other events such as "sound", "motion", and "snapshot." When the user designates a desired time on the timeline, an image corresponding to that time is displayed on a central screen. When such a timeline is provided to the user terminal 130, it also becomes possible for the user to appropriately narrow down the timing to which attention is to be paid in the video when checking the video for use in DX, as in the above case where the thumbnails are provided to the user terminal 130.

A timeline on which timing in the video at which various conditions set in the setting process described above are satisfied are shown on a single axis is used in the example illustrated in FIG. 7. However, in an embodiment, it is also possible to use a timeline on which timing in the video at which various conditions set in the setting process described above are satisfied are divided into and shown on a plurality of axes corresponding to different conditions as illustrated in FIG. 8 below.

Figure 8:
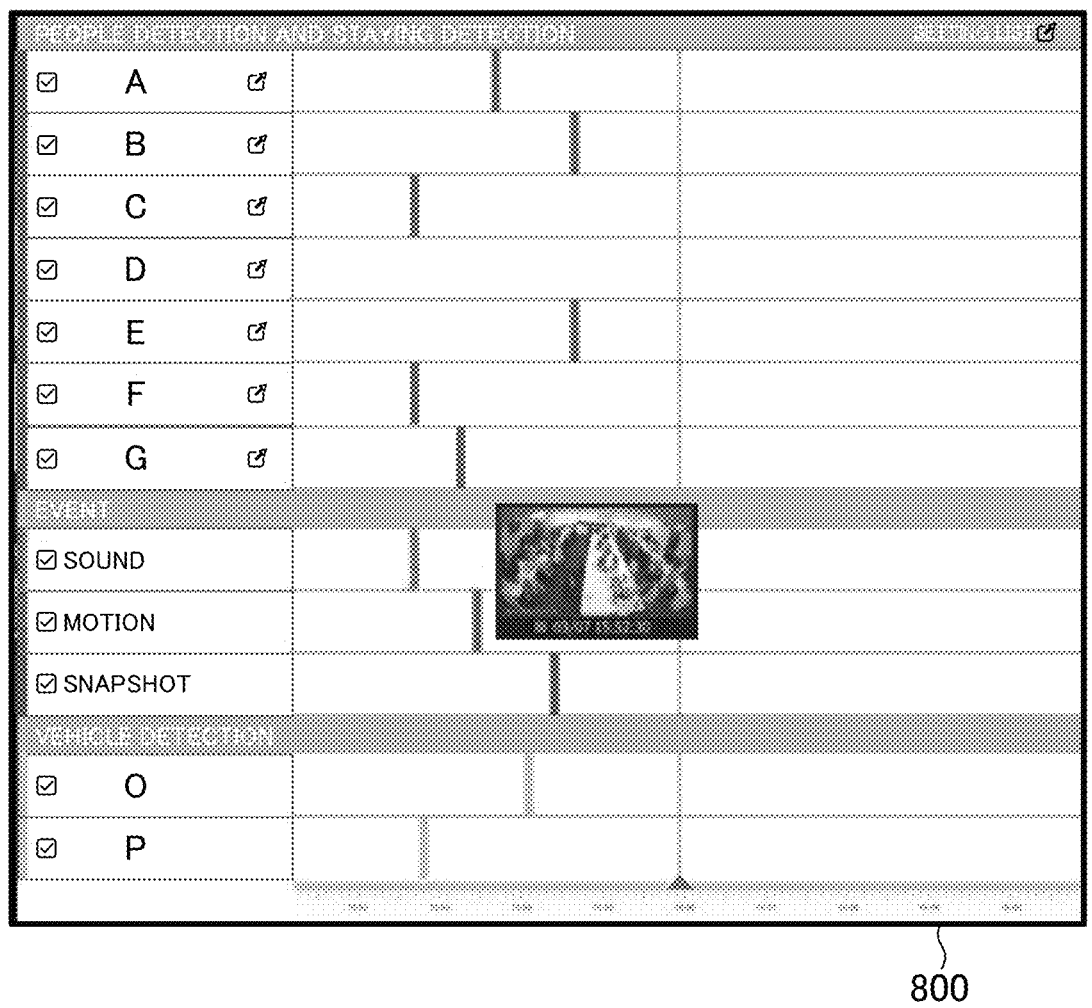
FIG. 8 is an exemplary and schematic diagram illustrating another example of a display mode of a timeline according to an embodiment.

FIG. 8 is an exemplary and schematic diagram illustrating another example of a display mode of a timeline according to an embodiment.

An image 800 illustrated in FIG. 8 is a different example from FIG. 7 of a UI including a timeline generated by the cloud platform 120. The image 800 illustrated in FIG. 8 includes a region 801 in which a timeline is displayed. This timeline differs from the timeline illustrated in FIG. 7 in that timing in the video at which various conditions are satisfied are divided into and shown on a plurality of axes. When such a timeline is provided to the user terminal 130, it becomes possible for the user to narrow down the timing to which attention is to be paid in the video from a more detailed viewpoint when checking the video for use in DX. In particular, when the number of settings increases, the display of detection results overlaps on a single-axis timeline, making it difficult to see, but that is not the case on a multiple-axis timeline. On the other hand, the multiple-axis timeline takes up space on the UI, but as illustrated in FIG. 8, a video window is reduced in size like a thumbnail, and when a time is designated on a timeline, the video window is enlarged to replay a video corresponding to that time.

Image information useful for DX is not limited to thumbnails and timelines described above. For example, in an embodiment, the image information generation unit 123 of the cloud platform 120 may also generate, for example, image information such as graphs illustrated in FIGS. 9 and 10 below.

Figure 9:
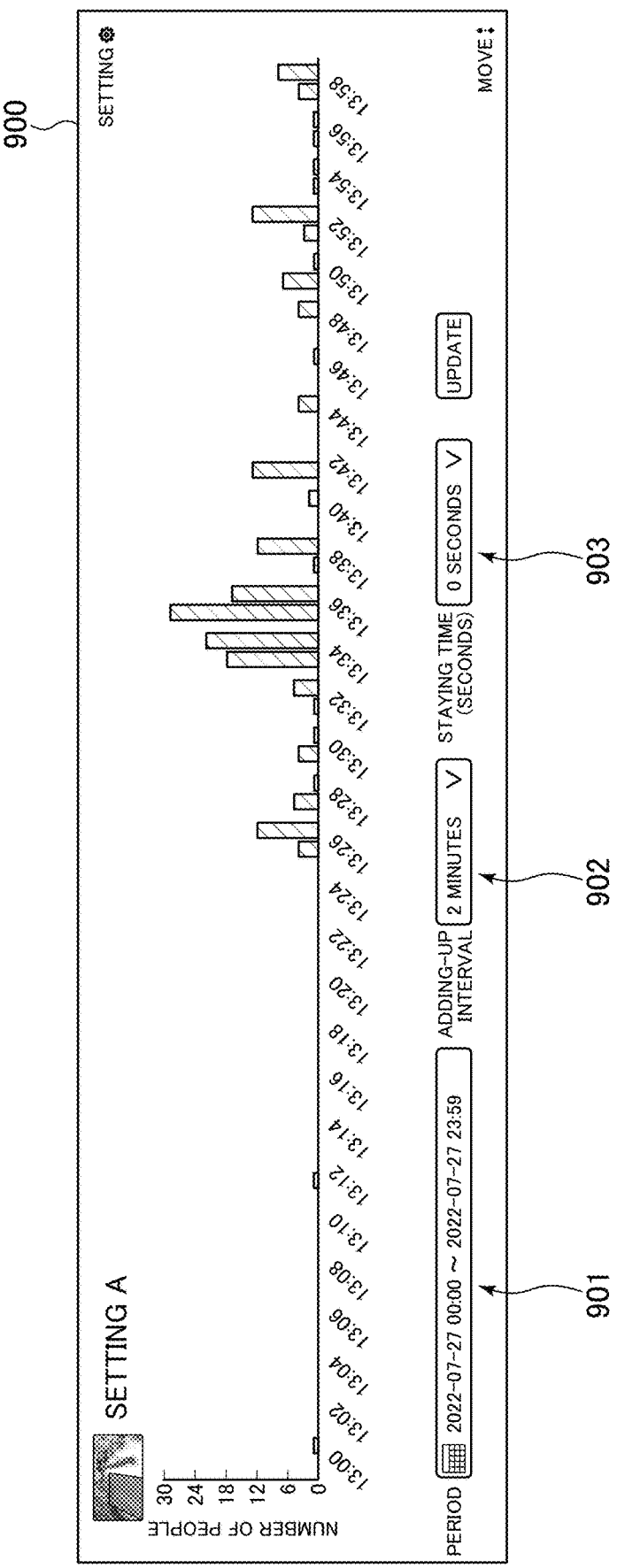
FIG. 9 is an exemplary and schematic diagram illustrating an example of a display mode of a graph according to an embodiment.

FIG. 9 is an exemplary and schematic diagram illustrating an example of a display mode of a graph according to an embodiment.

An image 900 illustrated in FIG. 9 is an example of a UI including a graph generated by the cloud platform 120. This UI can be provided to the user terminal 130 as information useful for DX in the check process which will be described later.

The image 900 illustrated in FIG. 9 displays a graph showing a time transition of the number of staying people detected. A thumbnail including the areas set in step S201 (see FIG. 2) and the name of the setting are displayed on the upper left. The image 900 illustrated in FIG. 9 includes an interface 901 for setting which period of graph to display, an interface 902 for adjusting the adding-up interval of the graph (the memory interval of the horizontal axis corresponding to each bar), and an interface 903 for adjusting the staying time (a condition to be added up). Changing these values and clicking an "UPDATE" button updates the graph according to the conditions. When such a graph is provided to the user terminal 130, it becomes possible to statistically determine the stay status of people in the target area.

A graph showing a time transition of the number of staying people is used in the example illustrated in FIG. 9. However, in an embodiment, a graph showing a time transition of the number of people who have passed a line set in the setting process described above such that the directions in which the people have passed the line are identified can also be used as shown in FIG. 10 below.

Figure 10:
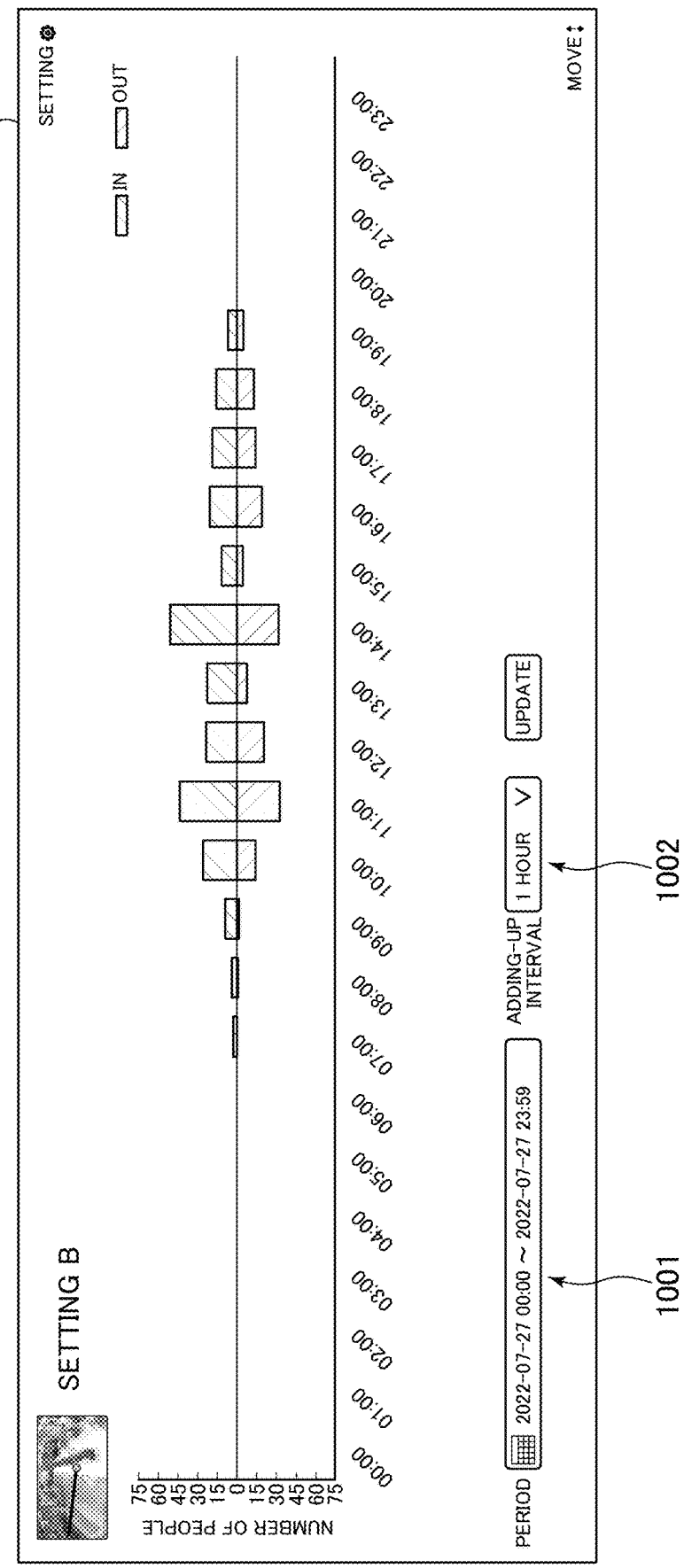
FIG. 10 is an exemplary and schematic diagram illustrating another example of a display mode of a graph according to an embodiment.

FIG. 10 is an exemplary and schematic diagram illustrating another example of a display mode of a graph according to an embodiment.

An image 1000 illustrated in FIG. 10 is a different example from FIG. 9 of a UI including a graph generated by the cloud platform 120. This image 1000 displays a graph showing a time transition of the number of people who have passed a line such that the directions in which the people have passed the line are identified. A thumbnail including the lines set in step S201 (see FIG. 2) and the name of the setting are displayed on the upper left. The image 1000 illustrated in FIG. 10 includes an interface 1001 for setting which period of graph to display and an interface 1002 for adjusting the adding-up interval of the graph (the memory interval of the horizontal axis corresponding to each bar). When such a graph is provided to the user terminal 130, it becomes possible to statistically determine the status of people entering and exiting across the line.

Returning to FIG. 2, a check process for checking the video captured and the information detected in the imaging process described above will be described.

In the check process, first, in step S221, the input reception unit 131 of the user terminal 130 receives a check request based on an operation from the user for checking the video captured and the information detected in the imaging process described above.

In step S222, the communication unit 132 of the user terminal 130 transmits the received check request to the cloud platform 120. The communication unit 121 of the cloud platform 120 then receives the check request transmitted by the user terminal 130.

In step S223, the image information generation unit 223 of the cloud platform 120 reads, in response to the check request received from the user terminal 130, the image information (a thumbnail, a timeline, or a graph) generated in the imaging process described above.

In step S224, the communication unit 121 of the cloud platform 120 transmits the image information read in step S223 to the user terminal 130. The communication unit 132 of the user terminal 130 then receives the image information transmitted by the cloud platform 120.

In step S225, the display and replay unit 133 of the user terminal 130 displays the image information received from the cloud platform 120 on a display (not illustrated). The image information is displayed, for example, in the forms illustrated in FIGS. 6 to 10 described above.

In step S226, the input reception unit 131 of the user terminal 130 receives a selection instruction as an operation that the user performs to select (designate) a video at a desired time in accordance with the image information described above. Specifically, this corresponds to selection of a thumbnail in FIG. 6, designation of a time on the timelines in FIGS. 7 and 8, designation of a bar on the graphs in FIGS. 9 and 10, and the like.

In step S227, the communication unit 132 of the user terminal 130 transmits the received selection instruction to the cloud platform 120. The communication unit 121 of the cloud platform 120 then receives the selection instruction transmitted by the user terminal 130.

In step S228, the image information generation unit 223 of the cloud platform 120 reads, in response to the selection instruction received from the user terminal 130, a video recorded in the imaging process described above. That is, the image information generation unit 223 reads a video at the time corresponding to the video selected (designated) in step S226.

In step S229, the communication unit 121 of the cloud platform 120 transmits the video read in step S228 to the user terminal 130. The communication unit 132 of the user terminal 130 then receives the video transmitted by the cloud platform 120.

In step S230, the display and replay unit 133 of the user terminal 130 replays the video received from the cloud platform 120 on the display (not illustrated). For example, the display and replay unit 133 replays the video on the central screen in the UI in FIG. 7. The video was selected (designated) through the UIs of FIGS. 6 to 10 in step S226. The display and replay unit 133 updates the central screen when the selection (designation) was an operation through the UI of FIG. 7 and performs transition to FIG. 7 when it was an operation through that of other than FIG. 7. In this manner, the check process ends.

As described above, the system 100 according to an embodiment displays a video captured by the camera 110 connected to a network (not illustrated). The system 100 may be configured to set, in response to instructions from a user, a threshold regarding the number of people staying in a target area (a first threshold) and a threshold regarding a time during which the people stay in the target area (a second threshold) according. The system 100 can be configured to measure (detect) the number of people staying in the target area and the time during which the people stay in the target area. The system 100 can be configured to generate, for example, a thumbnail showing a video corresponding to when the number of people who have stayed in the target area for a time equal to or longer than the second threshold is equal to or greater than the first threshold and display the generated thumbnail. Such a configuration can provide richer information usable for purposes other than crime prevention in accordance with the video captured by the camera 110.

In an embodiment, the system 100 can also be configured to further set the target area to be changeable. Such a configuration can provide information regarding various changeable target areas.

In an embodiment, the system 100 can also be configured to further set a condition regarding one or more of a desired time period, day of the week, or date, and also generate the thumbnail showing a video corresponding to when the condition is satisfied. Such a configuration can provide information from various viewpoints regarding one or more of a time period, day of the week, or date in addition to information from the viewpoint of the number of people staying in the target area and the time during which the people stay in the target area.

In an embodiment, the system 100 can also be configured to, when a plurality of thumbnails is displayed, select one of the displayed thumbnails in response to an instruction from the user and replay a video corresponding to the selected thumbnail. Such a configuration can easily check a video as more detailed information corresponding to the thumbnail by simply selecting a thumbnail.

In an embodiment, the system 100 can also be configured to measure the time during which people stay in the target area for each person and generate a thumbnail in accordance with the time measured for each person. Such a configuration can provide more detailed information unlike, for example, the case where people are not identified.

Further, in an embodiment, the system 100 can be configured to generate a timeline showing information corresponding to when the number of people who have stayed in a predetermined area for a time equal to or longer than the second threshold is equal to or greater than the first threshold in time series and display the generated timeline. Such a configuration can provide richer information usable for purposes other than crime prevention in accordance with the video captured by the camera 110, similar to using the thumbnail.

The system 100 according to an embodiment can also be configured to designate a time on the displayed timeline in response to an instruction from the user and replay a video corresponding to the designated time. Such a configuration can easily check a video as more detailed information at the designated time by simply designating a time on the timeline.

In an embodiment, the system 100 can also be configured to measure the time during which people stay in the target area for each person and generate a timeline in accordance with the time measured for each person. Such a configuration can provide more detailed information unlike, for example, the case where people are not identified.

Further, in an embodiment, the system 100 can be configured to set, in response to an instruction from the user, a line indicating a boundary line of a target area, an IN direction indicating a direction in which people enter the target area across the line, and an OUT direction indicating a direction in which people exit the target area across the line. The system 100 is configured to separately add up the number of people who have passed the line in the IN direction and the number of people who have passed the line in the OUT direction. The system 100 is configured to generate a graph separately showing the time transitions of the number of people who have passed the line in the IN direction and the number of people who have passed the line in the OUT direction and display the generated graph. Such a configuration can also provide richer information usable for purposes other than crime prevention in accordance with the video captured by the camera 110, similar to using the thumbnails and the timeline described above.

In an embodiment, the system 100 is also configured to designate a period during which the number of people is added up and generate a graph corresponding to an adding-up result within the designated period. Such a configuration allows various graphs to be easily generated according to the designated period.

In an embodiment, the system 100 is also configured to designate a time interval at which the number of people is added up multiple times and generate a graph of the adding-up at the designated time interval. Such a configuration allows various graphs to be easily generated according to designated time intervals.

Finally, a hardware configuration included in the camera 110, the cloud platform 120, and the user terminal 130 that constitute the system 100 according to the above embodiment will be described. In an embodiment, the camera 110, the cloud platform 120, and the user terminal 130 are each configured to include an information processing device 1100 having, for example, a hardware configuration illustrated in FIG. 11 below.

Figure 11:
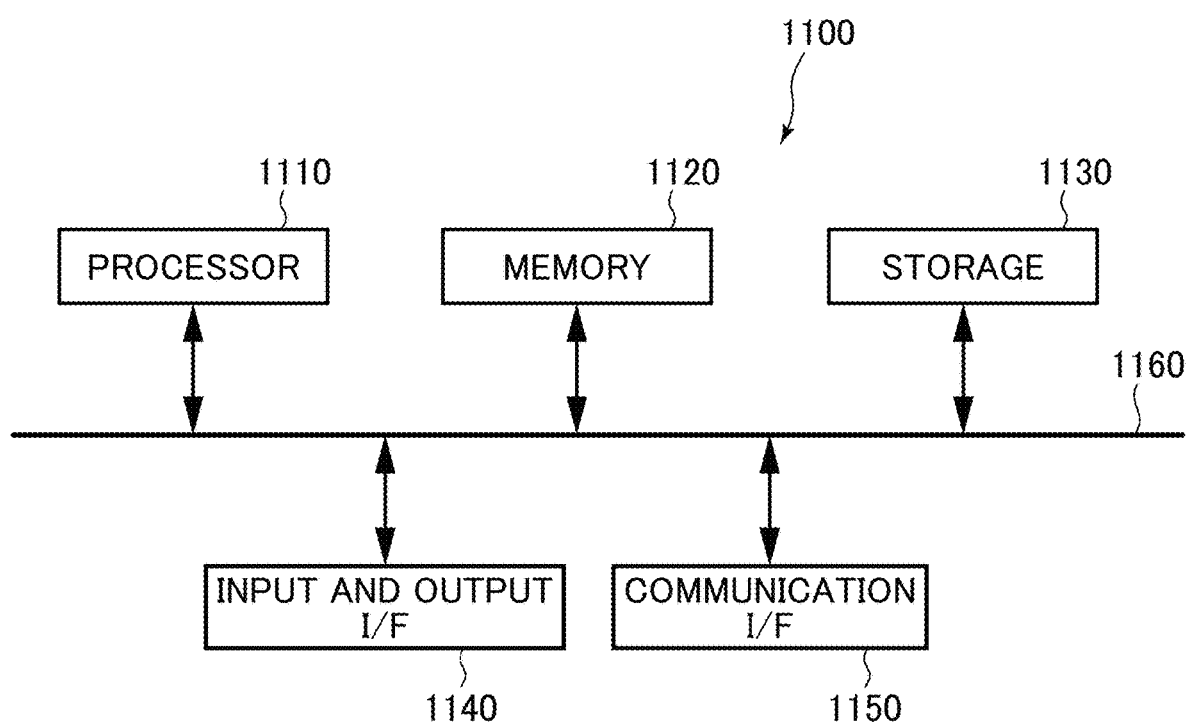
FIG. 11 is an exemplary and schematic block diagram illustrating a hardware configuration of an information processing device included in a camera, a cloud platform, and a user terminal according to an embodiment.

FIG. 11 is an exemplary and schematic block diagram illustrating the hardware configuration of the information processing device 1100 included in the camera 110, the cloud platform 120, and the user terminal 130 according to an embodiment.

FIG. 11 shows only a hardware configuration that is substantially common among the camera 110, the cloud platform 120, and the user terminal 130. Thus, it is to be noted that the actual hardware configuration of the camera 110, the cloud platform 120, and the user terminal 130 differ in various aspects in parts other than those illustrated in FIG. 11.

As illustrated in FIG. 11, the information processing device 1100 includes a processor 1110, a memory 1120, a storage 1130, an input and output interface (I/F) 1140, and a communication interface (I/F) 1150. These hardware components are connected to a bus 1160.

The processor 1110 is configured, for example, as a central processing unit (CPU) and controls the operation of each part of the information processing device 1100 in a centralized manner.

The memory 1120 includes, for example, a read only memory (ROM) and a random access memory (RAM) and implements volatile or non-volatile storage of various data such as programs executed by the processor 1110, provision of a work area for the processor 1110 to execute programs, and the like.

The storage 1130 includes, for example, a hard disk drive (HDD) or a solid state drive (SSD) and stores various data in a non-volatile manner.

The input and output interface 1140 controls input of data, for example, from an input device (not illustrated) such as a keyboard and a mouse to the information processing device 1100, and output of data, for example, from the information processing device 1100 to an output device (not illustrated) such as a display and a speaker.

The communication interface 1150 allows the information processing device 1100 to communicate with other devices.

The functional modules (see FIG. 1) included in the camera 110, the cloud platform 120, and the user terminal 130 according to an embodiment are implemented as a group of functional modules by hardware and software in cooperation as a result of the processor 1110 of each information processing device 1100 executing an information processing program stored in advance in the memory 1120 or the storage 1130. However, in an embodiment, some or all of the group of functional modules illustrated in FIG. 1 may be implemented by hardware alone such as specially designed circuits.

The information processing program described above does not necessarily have to be stored in advance in the memory 1120 or the storage 1130. For example, the information processing program described above may be provided as a computer program product recorded in an installable or executable format on a computer-readable medium such as various magnetic disks such as flexible disks (FD) or various optical disks such as digital versatile disks (DVDs).

The information processing program described above may be provided or distributed via a network such as the Internet. That is, the information processing program described above may be provided in a form of being stored on a computer connected to a network such as the Internet and being downloaded via the network.

Modifications

Figure 12:
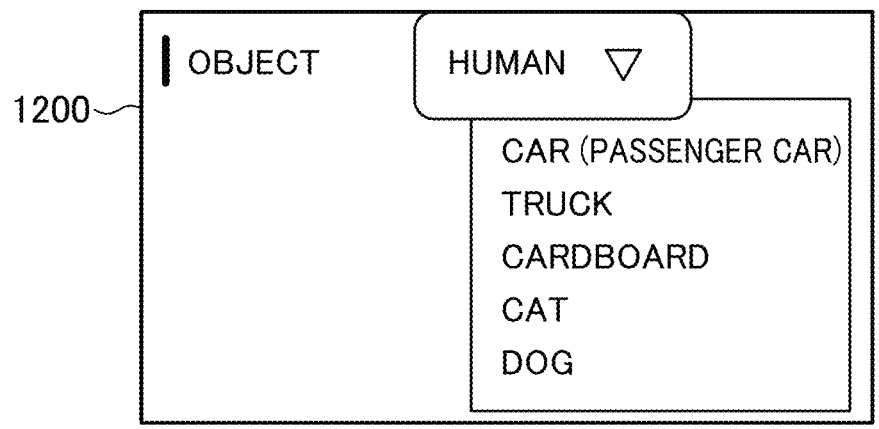
FIG. 12 is an exemplary and schematic diagram illustrating an example of an additional condition that can be set in a modification.
Figure 13:
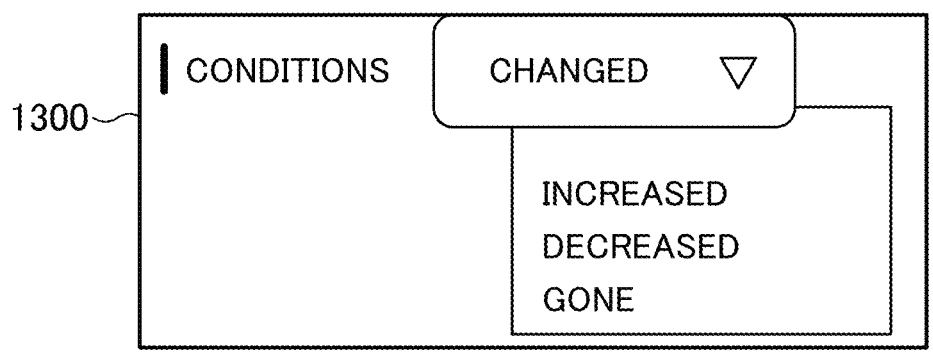
FIG. 13 is an exemplary and schematic diagram illustrating another example of an additional condition that can be set in a modification.

Configurations in which conditions that can be set in the setting process for the camera 110 are further added, for example, as illustrated in FIGS. 12 and 13 below are conceivable as modifications of the above embodiment.

FIG. 12 is an exemplary and schematic diagram illustrating an example of an additional condition that can be set in a modification.

An image 1200 illustrated in FIG. 12 can additionally be displayed on the UI that receives operations relating to setting conditions from the user as illustrated in FIG. 3 described above. This image 1200 includes an interface for designating the type of an object to be detected by the camera 110. Using this interface is useful because it can narrow down detection targets.

FIG. 13 is an exemplary and schematic diagram illustrating another example of an additional condition that can be set in a modification.

An image 1300 illustrated in FIG. 13 can also be additionally displayed on the UI that receives operations relating to setting conditions from the user as illustrated in FIG. 3 described above. This image 1300 includes an interface for designating the type of change in the number of detection targets to be detected by the camera 110. This interface is useful because it can easily detect that the number of detection targets has changed in a particular manner.

Although embodiments of the present disclosure have been described, these embodiments have been presented by way of example and are not intended to limit the scope of the invention. These novel embodiments can be implemented in various other forms, and various omissions, substitutions, and changes can be made without departing from the spirit of the invention. These embodiments and modifications thereof are included in the scope or spirit of the invention as well as in the scope of the invention described in the claims and their equivalents.

REFERENCE SIGNS LIST

100 System
110 Camera
111 Imaging unit
112 Detection unit
113 Communication unit
120 Cloud platform
121 Communication unit
122 Recording unit
123 Image information generation unit
130 User terminal
131 Input reception unit
132 Communication unit
133 Display and replay unit

The invention claimed is:

1. A system for displaying a video captured by a camera connected to a network, the system being configured to:
output a user interface including, on the same screen, interfaces for receiving instructions of a first threshold regarding the number of persons staying in a target area and a second threshold regarding a staying time during which each person stays in the target area;
set the first threshold and the second threshold in response to instructions from a user via the user interface;
measure the number of persons staying in the target area; measuring staying times for respective persons;
increase the number of persons staying in the target area at a timing when a predetermined time period elapses from a start of each of the staying times;
decrease the number of persons staying in the target area at the end of each of the staying times;
generate a thumbnail showing a video only when the number of persons, during a time equal to or longer than the second threshold, is equal to or greater than the first threshold; and
display the thumbnail generated.

2. The system according to claim 1 further configured to changeably set the target area.

3. The system according to claim 1 further configured to:
set a condition regarding one or more of a desired time period, day of the week, or date, and also generate the thumbnail showing a video when the condition is satisfied.

4. The system according to claim 1 configured to:
select, when a plurality of the thumbnails is displayed, a thumbnail of the thumbnails displayed in response to an instruction from the user; and
replay a video corresponding to the thumbnail selected.

5. The system according to claim 1 configured to:
measure, for each person, the staying time; and
generate the thumbnail in accordance with the period of time measured for each person.

6. A system for displaying a video captured by a camera connected to a network, the system being configured to:
set, in response to instructions from a user, a first threshold regarding the number of persons staying in a target area and a second threshold regarding staying time during which each person stays in the target area;
measure the number of persons staying in the target area;
increase the number of persons staying in the target area at a timing when a predetermined time period elapses from a start of each of the staying times;
decrease the number of persons staying in the target area at the end of each of the staying times;
generate a timeline including an object that indicates specific corresponding timing in the video at which the number of persons, during a time equal to or longer than the second threshold, is equal to or greater than the first threshold and that is arranged in time series; and
display the timeline generated.

7. The system according to claim 6 further configured to changeably set the target area.

8. The system according to claim 6 further configured to:
set a condition regarding one or more of a desired time period, day of the week, or date; and
also generate the timeline showing information when the condition is satisfied in time series.

9. The system according to claim 6 configured to:
designate a time from the timeline displayed in response to an instruction from a user; and
replay a video corresponding to the time designated.

10. The system according to claim 6 configured to:
measure, for each person, the staying time; and
generate the timeline in accordance with the period of time measured for each person.

11. The system according to claim 6 configured to:
once the object is designated by a user, display a video corresponding to the timing indicated by the designated object.

12. A non-transitory computer readable medium that records a program for displaying a video captured by a camera connected to a network, the program causing a computer to execute:
outputting a user interface including, on the same screen, interfaces for receiving instructions of a first threshold regarding the number of persons staying in a target area and a second threshold regarding a staying time during which each person stays in the target area;
setting the first threshold and the second threshold in response to instructions from a user via the user interface;
measuring the number of persons staying in the target area;
measuring staying times for respective persons;
increasing the number of persons staying in the target area at a timing when a predetermined time period elapses from a start of each of the staying times;
decreasing the number of persons staying in the target area at the end of each of the staying times;
generating a thumbnail showing a video only when the number of persons, during a time equal to or longer than the second threshold, is equal to or greater than the first threshold; and
displaying the thumbnail generated.

13. A non-transitory computer readable medium that records a program for displaying a video captured by a camera connected to a network, the program causing a computer to execute:
setting, in response to instructions from a user, a first threshold regarding the number of persons staying in a target area and a second threshold regarding staying time during which each person stays in the target area;
measuring the number of persons staying in the target area;
increasing the number of persons staying in the target area at a timing when a predetermined time period elapses from a start of each of the staying times;
decreasing the number of persons staying in the target area at the end of each of the staying times;
generating a timeline including an object that indicates specific corresponding timing in the video at which the number of persons, during a time equal to or longer than the second threshold, is equal to or greater than the first threshold and that is arranged in time series; and
displaying the timeline generated.

* * * * *